(12) United States Patent
Gao et al.

(10) Patent No.: US 11,776,413 B2
(45) Date of Patent: Oct. 3, 2023

(54) AERIAL VEHICLE FLIGHT CONTROL METHOD AND DEVICE THEREOF

(71) Applicant: SZ DJI TECHNOLOGY CO., LTD., Shenzhen (CN)

(72) Inventors: Mingming Gao, Shenzhen (CN); Ang Liu, Shenzhen (CN); Kang Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 167 days.

(21) Appl. No.: 17/195,611

(22) Filed: Mar. 8, 2021

(65) Prior Publication Data

US 2021/0217319 A1 Jul. 15, 2021

Related U.S. Application Data

(63) Continuation of application No. 16/432,049, filed on Jun. 5, 2019, now Pat. No. 10,943,495, which is a
(Continued)

(51) Int. Cl.
*G08G 5/00* (2006.01)
*B64C 13/04* (2006.01)
(Continued)

(52) U.S. Cl.
CPC .......... *G08G 5/0069* (2013.01); *B64C 13/04* (2013.01); *B64C 39/024* (2013.01); *B64D 43/00* (2013.01);
(Continued)

(58) Field of Classification Search
CPC .... G08G 5/0069; G08G 5/0034; G08G 5/006; G08G 5/0082; G08G 5/045; B64C 13/04;
(Continued)

(56) References Cited

U.S. PATENT DOCUMENTS 6,474,603 B1   11/2002   Kinkead et al.
8,626,361 B2   1/2014   Gerlock
(Continued)

FOREIGN PATENT DOCUMENTS

CN   1230350 C     12/2005
CN   201000576 Y   1/2008
(Continued)

OTHER PUBLICATIONS

The World Intellectual Property Organization (WIPO) International Search Report for PCT/CN2014/086474 dated Jun. 16, 2015 8 Pages.
(Continued)

*Primary Examiner* — Frederick M Brushaber
(74) *Attorney, Agent, or Firm* — ANOVA LAW GROUP, PLLC (57) ABSTRACT

A method for processing flight data includes acquiring, by detecting devices carried by one or more first aerial vehicles, environmental data associated to a position region; and sending, by the one or more first aerial vehicles, the environmental data to an external device. The environmental data is configured to generate a flight control instruction for controlling an operation of a second aerial vehicle while the second aerial vehicle is within the position region.

20 Claims, 5 Drawing Sheets

Related U.S. Application Data continuation of application No. 15/457,803, filed on Mar. 13, 2017, now Pat. No. 10,325,505, which is a continuation of application No. PCT/CN2014/086474, filed on Sep. 15, 2014.

(51) Int. Cl.

| | | |
|---|---|---|
| *B64C 39/02* | (2023.01) | |
| *B64D 43/00* | (2006.01) | |
| *G05D 1/00* | (2006.01) | |
| *G08G 5/04* | (2006.01) | |
| *G05D 1/10* | (2006.01) | |
| *G06T 15/00* | (2011.01) | |
| *G06T 19/20* | (2011.01) | |

(52) U.S. Cl.
CPC ............ *G05D 1/0011* (2013.01); *G05D 1/106* (2019.05); *G08G 5/006* (2013.01); *G08G 5/0034* (2013.01); *G08G 5/0082* (2013.01); *G08G 5/045* (2013.01); *B64U 2201/20* (2023.01); *G06T 15/005* (2013.01); *G06T 19/20* (2013.01); *Y02T 50/40* (2013.01)

(58) Field of Classification Search
CPC . B64C 39/024; B64C 2201/146; B64D 43/00; G05D 1/0011; G05D 1/106; G05D 1/102; G06T 15/005; G06T 19/20; Y02T 50/40
See application file for complete search history.

(56) References Cited

U.S. PATENT DOCUMENTS

| | | | |
|---|---|---|---|
| 8,930,044 B1* | 1/2015 | Peeters | B64C 19/00 |
| | | | 709/201 |
| 9,169,030 B2* | 10/2015 | Wong | B64C 27/08 |
| 9,533,760 B1* | 1/2017 | Wagreich | H04N 23/90 |
| 9,701,408 B1 | 7/2017 | Willison | |
| 9,741,255 B1 | 8/2017 | Navot et al. | |
| 9,849,999 B1 | 12/2017 | Fymat | |
| 9,947,229 B2 | 4/2018 | Lynar et al. | |
| 10,140,874 B2 | 11/2018 | Yang et al. | |
| 2006/0085106 A1 | 4/2006 | Gaudiano et al. | |
| 2008/0109127 A1 | 5/2008 | Ozaki | |
| 2009/0242693 A1 | 10/2009 | Urnes et al. | |
| 2011/0015816 A1 | 1/2011 | Dow et al. | |
| 2011/0216200 A1* | 9/2011 | Chung | H04N 7/183 |
| | | | 348/148 |
| 2013/0060520 A1* | 3/2013 | Amor | G01C 15/008 |
| | | | 702/150 |
| 2013/0270394 A1 | 10/2013 | Downs et al. | |
| 2014/0081483 A1 | 3/2014 | Weinmann et al. | |
| 2014/0131510 A1 | 5/2014 | Wang et al. | |
| 2014/0166816 A1 | 6/2014 | Levien et al. | |
| 2014/0172193 A1 | 6/2014 | Levien et al. | |
| 2014/0172194 A1 | 6/2014 | Levien et al. | |
| 2014/0172357 A1 | 6/2014 | Heinonen | |
| 2014/0222248 A1 | 8/2014 | Levien et al. | |
| 2014/0249741 A1 | 9/2014 | Levien et al. | |
| 2014/0288813 A1 | 9/2014 | Levien et al. | |
| 2014/0303884 A1 | 10/2014 | Levien et al. | |
| 2014/0316616 A1 | 10/2014 | Kugelmass | |
| 2015/0019047 A1 | 1/2015 | Chandrashekarappa et al. | |
| 2015/0094883 A1* | 4/2015 | Peeters | B64C 39/024 |
| | | | 701/3 |
| 2015/0158513 A1* | 6/2015 | Costa | B61L 23/041 |
| | | | 348/144 |
| 2015/0203213 A1 | 7/2015 | Levien et al. | |
| 2015/0284010 A1 | 10/2015 | Beardsley et al. | |
| 2015/0304634 A1* | 10/2015 | Karvounis | G06F 18/21355 |
| | | | 348/46 |
| 2015/0323930 A1 | 11/2015 | Downey et al. | |
| 2015/0336667 A1 | 11/2015 | Srivastava et al. | |
| 2015/0336668 A1 | 11/2015 | Pasko et al. | |
| 2015/0336669 A1 | 11/2015 | Kantor et al. | |
| 2015/0379874 A1 | 12/2015 | Ubhi et al. | |
| 2016/0055685 A1* | 2/2016 | Lilly | G07C 5/0808 |
| | | | 701/1 |
| 2016/0111006 A1 | 4/2016 | Srivastava et al. | |
| 2016/0125740 A1 | 5/2016 | Pasko et al. | |
| 2016/0189101 A1 | 6/2016 | Kantor et al. | |
| 2016/0196525 A1 | 7/2016 | Kantor et al. | |
| 2016/0216711 A1 | 7/2016 | Srivastava et al. | |
| 2016/0247404 A1 | 8/2016 | Srivastava et al. | |
| 2016/0299233 A1 | 10/2016 | Levien et al. | |
| 2016/0300492 A1 | 10/2016 | Pasko et al. | |
| 2016/0300493 A1 | 10/2016 | Ubhi et al. | |
| 2016/0300495 A1 | 10/2016 | Kantor et al. | |
| 2016/0307447 A1 | 10/2016 | Johnson et al. | |
| 2018/0190130 A1 | 7/2018 | Kube et al. | |

FOREIGN PATENT DOCUMENTS

| | | |
|---|---|---|
| CN | 102289230 A | 12/2011 |
| CN | 102495634 A | 6/2012 |
| CN | 102591358 A | 7/2012 |
| CN | 102707724 A | 10/2012 |
| CN | 102749847 A | 10/2012 |
| CN | 202563322 U | 11/2012 |
| CN | 103116360 A | 5/2013 |
| CN | 103872795 A | 6/2014 |
| CN | 104007766 A | 8/2014 |
| CN | 105068486 A | 11/2015 |
| CN | 204906394 U | 12/2015 |
| CN | 105242684 A | 1/2016 |
| CN | 105556408 A | 5/2016 |
| JP | H11139396 A | 5/1999 |
| JP | H11259659 A | 9/1999 |
| JP | 2000147085 A | 5/2000 |
| JP | 2003004352 A | 1/2003 |
| JP | 2007017414 A | 1/2007 |
| JP | 2014123306 A | 7/2014 |
| WO | 2003004352 A1 | 1/2003 |

OTHER PUBLICATIONS

Tsinghua University, Machine translation CN 102749847 A, Oct. 24, 2012 (Year: 2012).
Nes & Tec Co. LTD, Machine translation CN 102289230 A, Dec. 21, 2011 (Year: 2011).
Xin Chen, et al., Bearing Only Method Based on Optimal Data in Multi-UAV Co-Location, Signal Processing, Oct. 2010, pp. 1466-1472, vol. 26, No. 10, China.
Yilong Shao, et al., Cooperative Formation Control of Multiple Unmanned Aerial Vehicles, Science & Technology Information, Dec. 2013, pp. 111-112, China.
Alejandro Vignoni, et al., UAV Reference Conditioning for Formation Control via Set Invariance and Sliding Modes, IFAC Proceedings Volumes, Sep. 2012, pp. 317-322, vol. 45, No. 26.

* cited by examiner

AERIAL VEHICLE FLIGHT CONTROL METHOD AND DEVICE THEREOF

CROSS-REFERENCE TO RELATED APPLICATIONS

This is a continuation application of U.S. application Ser. No. 16/432,049, filed on Jun. 5, 2019, which is a continuation application of U.S. application Ser. No. 15/457,803, filed on Mar. 13, 2017, now U.S. Pat. No. 10,325,505, which is a continuation application of International Application No. PCT/CN2014/086474, filed on Sep. 15, 2014, the entire contents of all of which are incorporated herein by reference.

TECHNICAL FIELD

The present invention relates to the field of electronic technology and, in particular, to a flight control method for an aerial vehicle and a related flight control device.

BACKGROUND OF THE INVENTION

Aerial vehicles are those machines that use propulsion force provided by a propulsion system, such as airplane engines, electric motors, and propeller systems, to take off the ground and move in the air. An unmanned aerial vehicle (UAV) is an aerial vehicle that can perform various kinds of flight actions and flight tasks automatically or semi-automatically under the coordination control of an electronic device.

In order to adapt to environments better during a flight, an existing unmanned aerial vehicle is generally provided with a variety of sensors, such as a camera, and an ultrasonic wave sensor, in order to acquire flight indication data, to analyze the flight indication data, and to control the flight according to an analysis result. For example, a flight control operation is performed for avoiding an obstacle. However, mounting various kinds of sensors will raise the cost of the aerial vehicles significantly, increase the volume and weight of the whole unmanned aerial vehicles, and shorten the remaining flight time of the unmanned aerial vehicle.

SUMMARY OF THE INVENTION

The technical problem to be solved mainly by an embodiment of the present invention is to provide a flight control method for an aerial vehicle and a related device, which can implement a flight control for an unmanned aerial vehicle with low cost and ensure the amount of flight time of the aerial vehicle.

In one aspect, the present invention provides a flight control method for an aerial vehicle comprising:

receiving flight indication data under a current environment, the flight indication data including flight indication data detected by another aerial vehicle or provided by an external storage device;

generating a flight control instruction according to the received flight indication data to control a flight of the aerial vehicle.

In some embodiments, optionally, before receiving the flight indication data under a current environment, the method further comprises:

determining whether flight indication data of an environment where a current position lies on is stored;

if it is determined that the flight indication data of an environment of a current position is not stored, sending a download request for requesting to download flight indication data from the external storage device, the download request including current position information.

In some embodiments, optionally, receiving flight indication data under a current environment comprises: receiving the flight indication data of an environment of a current position broadcast by another unmanned aerial vehicle at a preset frequency.

In some embodiments, optionally, generating a flight control instruction according to the received flight indication data comprises:

detecting whether a current position is located at a position region included in the received flight indication data;

if it is detected that a current position is located at a position region included in the received flight indication data, generating the flight control instruction according to the received flight indication data.

In some embodiments, optionally, generating a flight control instruction according to the received flight indication data comprises:

determining an environmental map of the current environment according to the received flight indication data, the determined environmental map including a three-dimensional environmental map;

generating the flight control instruction according to the determined environmental map and a current position of the aerial vehicle.

In some embodiments, optionally, generating a flight control instruction according to the received flight indication data comprises:

determining a data object included in the flight indication data;

when obstacle data for indicating an obstacle avoidance flight is included in the flight indication data, calculating a distance value between the aerial vehicle and an edge of an obstacle according to obstacle position information in the obstacle data and a current coordinate position and altitude of the aerial vehicle, and generating an obstacle avoidance flight instruction according to the calculated distance value;

when flight path data is included in the flight indication data, generating the flight control instruction according to the flight path data and the coordinate position of the aerial vehicle itself so as to make the aerial vehicle fly along a path indicated by the flight path data.

In some embodiments, optionally, generating a flight control instruction according to the received flight indication data comprises:

detecting flight state information of the aerial vehicle;

if the detected flight state information meets a preset flight-stopping condition, extracting aerial vehicle dock data included in the received flight indication data;

generating the flight control instruction to control the aerial vehicle to fly towards an aerial vehicle dock indicated by the aerial vehicle dock data and to land on the aerial vehicle dock;

the aerial vehicle dock data includes position data of the aerial vehicle dock.

In some embodiments, optionally, generating a flight control instruction according to the received flight indication data comprises:

when no-fly zone indication information is included in the flight indication data, determining a minimum distance to a border of a no-fly zone indicated by the no-fly zone indication information according to a current position;

when the determined minimum distance is less than a preset distance threshold or the current position is within the no-fly zone, generating the flight control instruction for controlling the aerial vehicle to fly away from the no-fly zone.

In some embodiments, optionally, the method further comprises:

deploying a detecting module to acquire environmental data during a flight;

sending the detected environmental data to an external storage device at a target address or broadcasting the detected environmental data at a preset frequency.

In another aspect, an embodiment of the present invention may further provide a method for processing flight data comprising:

receiving environmental data acquired and uploaded by various kinds of aerial vehicles during flights, the environmental data including image data and position data of an environment;

processing the environmental data in accordance with position regions according to the position data included in the received environmental data to obtain flight indication data of a corresponding position region.

In some embodiments, optionally, the method further comprises:

upon receiving a download request for requesting to download flight instruction data, searching the flight indication data of a corresponding position region according to position information included in the download request;

encapsulating the flight indication data of the corresponding position region in accordance with a negotiated data format, and sending the encapsulated flight indication data to an aerial vehicle sending the download request.

In some embodiments, optionally, processing the environmental data in accordance with position regions according to the position data included in the received environmental data to obtain flight indication data of a corresponding position region comprises:

updating a three-dimensional environmental map of the corresponding position region according to the position data included in the received environmental data;

using the updated three-dimensional environmental map as the flight indication data of the corresponding position region.

In some embodiments, optionally, processing the received environmental data in accordance with position regions according to the position data included in the received environmental data to obtain flight indication data of a corresponding position region comprises:

determining a receiving time of the received environmental data;

determining a latest update time of a map content of a region corresponding to the position data of the received environmental data in a current three-dimensional environmental map;

updating a map of the corresponding position region in the generated three-dimensional environmental map according to environmental data corresponding to a receiving time later than the latest update time, and taking the updated three-dimensional environmental map as the flight indication data.

In some embodiments, optionally, after receiving environmental data acquired and uploaded by various aerial vehicles during flights, the method further comprises:

storing environmental data with similar contents in a same data set;

performing storage management on various data sets according to a preset storage management rule, the storage management comprises deletion management for environmental data;

wherein the storage management rule is set based on any one or combination of a receiving time of the environmental data, image quality of image data in the environmental data and a difference between image contents in the environmental data with same contents;

in the environmental data with similar contents included in the same data set, a distance value between any two environmental data acquiring position points is less than a preset distance threshold, and a difference value between any two environmental data acquiring azimuth angles relative to a reference direction is less than a preset angle threshold; alternatively, in the environmental data with similar contents included in the same data set, the similarity between images of any two image data reaches a preset similarity threshold.

In some embodiments, optionally, processing the environmental data in accordance with position regions according to the position data included in the received environmental data to obtain flight indication data of a corresponding position region comprises:

selecting desired environmental data from various data sets of the environmental data in accordance with a preset selection rule;

processing various desired environmental data in accordance with position regions according to position data included in the various desired environmental data, to obtain the flight indication data of the corresponding position region;

wherein the selection rule is set based on any one or combination of the receiving time of the environmental data, the image quality of image data in the environmental data and a difference between image contents in the environmental data with same contents.

In yet another aspect, an embodiment of the present invention may further provide an aerial vehicle comprising a communication device and a flight controller, the flight controller is configured for generating a flight control instruction according to flight indication data under a current environment which is received by the communication device, to control a flight of the aerial vehicle; the flight indication data including flight indication data detected by another unmanned aerial vehicle or provided by an external storage device.

In some embodiments, optionally, the flight controller is further configured for determining whether flight indication data of an environment where a current position lies on is stored during a flight; if it is determined that the flight indication data of an environment of a current position is not stored, sending a download request for requesting to download the flight indication data from the external storage device by the communication device, the download request including position information of the current environment.

In some embodiments, optionally, the flight controller is further configured for controlling the communication module to receive at a preset frequency the flight indication data of the environment of the current position broadcast by the another unmanned aerial vehicle.

In some embodiments, optionally, the flight controller is specifically configured for detecting whether the current position is located at a position region described in the received flight indication data; if it is detected that a current position is located at a position region included in the received flight indication data, generating the flight control instruction according to the received flight indication data.

In some embodiments, optionally, the flight controller is specifically configured for determining an environmental map of the current environment according to the received flight indication data; generating a flight control instruction according to the determined environmental map and a current position of the aerial vehicle, the determined environmental map including a three-dimensional environmental map.

In some embodiments, optionally, the flight controller is specifically configured for, if obstacle data for indicating an obstacle avoidance flight is included in the flight indication data, calculating a distance value between the aerial vehicle and an edge of an obstacle according to obstacle position information in the obstacle data, current coordinate position and altitude of the aerial vehicle, and generating an obstacle avoidance flight instruction according to the calculated distance value; if flight path data is included in the flight indication data, generating the flight control instruction according to the flight path data and a coordinate position of the aerial vehicle itself, to make the aerial vehicle fly along a path indicated by the flight path data.

In some embodiments, optionally, the flight controller is specifically configured for detecting flight state information of the aerial vehicle; if the detected flight state information meets a preset flight-stopping condition, extracting aerial vehicle dock data included in the received flight indication data; generating a flight control instruction to control the aerial vehicle to fly towards an aerial vehicle dock indicated by the aerial vehicle dock data and to land on the aerial vehicle dock; the aerial vehicle dock data includes position data of the aerial vehicle dock.

In some embodiments, optionally, the flight controller is specifically configured for, if no-fly zone indication information is included in the flight indication data, determining a minimum distance to a border of a no-fly zone indicated by the no-fly zone indication information according to a current position; if the determined minimum distance is less than a preset distance threshold or the current position is within the no-fly zone, generating a flight control instruction for controlling the aerial vehicle to fly away from the no-fly zone.

In some embodiments, optionally, the flight controller is further configured for acquiring environmental data during a flight; sending the detected environmental data to an external storage device at a target address or broadcasting the detected environmental data at a preset frequency.

In still yet another aspect, an embodiment of the present invention may further provide a server comprising a communication device and a processor, the communication device is configured for receiving environmental data acquired and uploaded by various kinds of aerial vehicles during flights, the environmental data including image data and position data of an environment;

the processor is configured for processing the received environmental data in accordance with position regions according to the position data included in the received environmental data to obtain flight indication data of a corresponding position region.

In some embodiments, optionally, the processor is further configured for, when the communication device receives a download request for requesting to download flight indication data, searching the flight indication data of the corresponding position region according to position information included in the download request; encapsulating the flight indication data of the corresponding position region in accordance with a negotiated data format, and sending the encapsulated flight indication data to an aerial vehicle sending the download request via the communication device.

In some embodiments, optionally, the processor is specifically configured for updating a three-dimensional environmental map of the corresponding position region according to the position data included in the received environmental data; and using the updated three-dimensional environmental map as the flight indication data of the corresponding position region.

In some embodiments, optionally, the processor is specifically configured for determining a receiving time of the received environmental data; determining a latest update time of map content of a region corresponding to the position data of the received environmental data in a current three-dimensional environmental map; updating map content of the corresponding position region in the current three-dimensional environmental map according to the environmental data with a receiving time later than the latest update time, and using the updated three-dimensional environmental map as the flight indication data.

In some embodiments, optionally, the processor is further configured for storing environmental data with similar contents in a same data set; performing storage management on various data sets according to a preset storage management rule, the storage management comprises deletion management for environmental data; wherein the storage management rule is set based on any one or combination of a receiving time of the environmental data, image quality of image data in the environmental data and a difference between image contents in the environmental data with same contents; in the environmental data with similar contents in the same data set, a distance value between any two environmental data acquiring position points is less than a preset distance threshold and a difference value between any two environmental data acquiring azimuth angles relative to a reference direction is less than a preset angle threshold; or in the environmental data with similar contents included in the same data set, a similarity between images of any two image data reaches a preset similarity threshold.

In some embodiments, optionally, the processor is specifically configured for selecting desired environmental data from various data sets of the environmental data in accordance with a preset selection rule; processing various desired environmental data in accordance with position regions according to the position data included in various desired environmental data, to obtain the flight indication data of the corresponding position region; wherein the selection rule is set based on any one or combination of a receiving time of the environmental data, image quality of image data in the environmental data and a difference between image contents in the environmental data with same contents.

An embodiment of the present invention can enable an aerial vehicle to implement a control of its own flight by relying on related flight indication data shared from other aerial vehicles or servers, such that the aerial vehicle does not need to carry a large number of detecting devices, reducing a volume and weight, increasing a flight distance and reducing the cost of the aerial vehicle.

DETAILED DESCRIPTION OF THE INVENTION

The technical solutions of the present invention will be described below in combination with the drawings in the embodiments of the present invention. It should be apparent that embodiments described herein are only a part rather than all of the embodiments of the present invention. Other embodiments obtained by those with ordinary skill in the art on the basis of the disclosed embodiments of the present invention without inventive efforts should fall within the scope of the present invention.

According to an embodiment of the present invention, an aerial vehicle can obtain flight indication data of a related position from a server or other unmanned aerial vehicles and, based on the obtained flight indication data, perform operations such as obstacle avoidance, automatic navigation, secure flight path planning, and the like. without carrying cameras, distance detectors, or other devices. It should be noted that, the flight indication data as used in various embodiments of the present invention may comprise flight indication data within a certain region range with respect to a corresponding position, including, specifically, a three-dimensional environmental map within the certain region. The aerial vehicle involved comprises at least a functional module for positioning, for example, a positioning module with a GPS (Global Positioning System), to determine the position of the aerial vehicle and to determine the flight indication data needs to be obtained according to the position.

Figure 8:
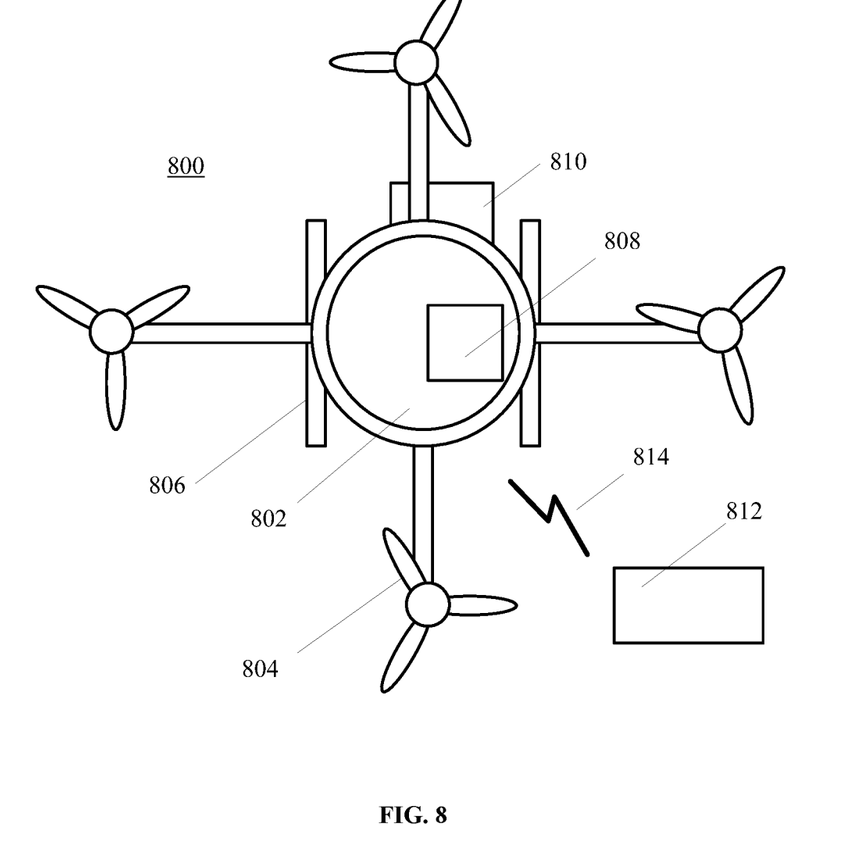
FIG. 8 is a schematic view of an exemplary aerial vehicle operating environment according to an embodiment of the present invention.

FIG. 8 illustrates an exemplary aerial vehicle operating environment according to an embodiment of the present invention. As shown in FIG. 8, an aerial vehicle 800 may include a body 802, a flight system 804, a landing system 806, an onboard controller 808, and a payload 810. Certain components may be omitted and other components may be included. Further, the aerial vehicle 800 may also communicate with an external controller 812, such as a server, a user terminal, or another aerial vehicle. The aerial vehicle 800 may communicate with the external controller 812 via a wireless network 814.

The aerial vehicle 800 may include any appropriate type of unmanned aerial vehicle, such as a drone, a UAV, or a remote-control flying device, etc. The body 802 may include any appropriate body structure to host various components, including the onboard controller 808. The flight system 804 may include a propulsion system to lift, fly, and land the aerial vehicle. The onboard controller 808 may include a hardware processor, memory, and other peripheral devices to provide control functions for the aerial vehicle 800, such as flight control, power control, communication, payload control, and other related functions.

The payload 810 may include a camera or any device related to applications of the aerial vehicle 800. The external controller 812 may be provided to communicate with the aerial vehicle 800 to receive from and send to information to the aerial vehicle 800, including flight indication data, flight control data, flight commands, payload information, etc. Further, the wireless network 814 may include any appropriate wireless network suitable for communication between the aerial vehicle 800 and the external controller 812, such as a WIFI network, a satellite network, or a cellular network, etc.

Figure 1:
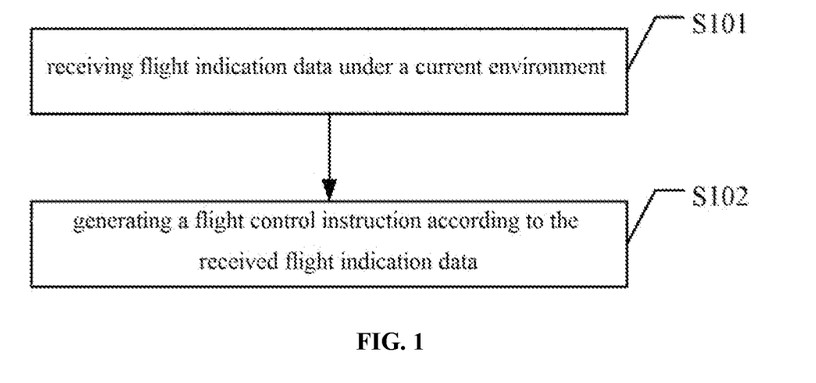
FIG. 1 is a flow chart of a flight control method for an aerial vehicle according to an embodiment of the present invention.

Referring to FIG. 1, a flow chart of a flight control method for an aerial vehicle according to an embodiment of the present invention, the flight control method may be implemented by a controller. The controller may be a controller separated from the aerial vehicle but connected with the flight control of the aerial vehicle, a flight controller disposed in the aerial vehicle, or a smart mobile terminal configured to control the flight of the aerial vehicle. Specifically, the flight control method may include following steps.

S101: receiving flight indication data under the current environment, the flight indication data including flight indication data detected by another unmanned aerial vehicle or provided by an external storage device.

The flight indication data may include certain three-dimensional environmental map data used to guide the aerial vehicle to fly around an obstacle or to fly according to a flight route. The flight indication data may also include some related data of an obstacle in the environment that might impact the flight of the aerial vehicle, for example, size of the obstacle, a substantial range of coordinate position of the obstacle, or the like. The external storage device may be a preconfigured server. The followings will be described using a server as an example.

The another unmanned aerial vehicle mainly refers to an unmanned aerial vehicle with various kinds of detecting devices, such as a camera, an ultrasonic wave sensor, a radar or the like. Based on environmental images and distance data detected in real time by the detecting devices, combined with positioning data from its own GPS, such unmanned aerial vehicle can obtain environmental data of a region corresponding to a certain coordinate position. Such unmanned aerial vehicle can then send the obtained environmental data to a designated server or unmanned aerial vehicle, or merge the obtained environmental data to obtain a three-dimensional environmental map of an environmental region corresponding to a certain coordinate position and then send the three-dimensional environmental map as the flight indication data of the corresponding position to the designated server or unmanned aerial vehicle.

The server may be an open server, which may receive the environmental data uploaded by a variety of unmanned aerial vehicles and perform a location-based storage management on the uploaded environmental data based on position data in the environmental data. The server may also merge a large amount of environmental data and their corresponding positions to obtain a more precise three-dimensional environmental map of some position regions, and provide the three-dimensional environmental map as the flight indication data to some aerial vehicles requiring it.

The aerial vehicles corresponding to the controllers performing Step S101 may be some low-end unmanned aerial vehicles, which cannot detect their external environment. In S101, if the received flight indication data is the three-dimensional environmental map within a region range of the low-end unmanned aerial vehicle directly provided by the server or other aerial vehicles, the three-dimensional environmental map may be directly used to perform a control-instruction-generating operation. The received flight indication data also may be other data, for example, obstacle data, in which case a distance may be calculated to avoid the obstacle according to an absolute coordinate position region of an obstacle in the obstacle data and position coordinates of the aerial vehicle.

Of course the received flight indication data may also be some raw data, for example, a picture shot originally, a coordinate position when shooting, and the like, the controller may perform a data merging operation based on a large amount of raw data first, and then obtain a corresponding three-dimensional environmental map at the current position, and further perform a corresponding instruction-generating operation.

It should be noted that, the three-dimensional environmental map may be generated according to the environmental data including positions, a large amount of images, and the like, detected by various kinds of sensors. Specifically, the three-dimensional environmental map may be generated by processing a large amount of three-dimensional images obtained at different positions in a certain region. Any appropriate methods may be used.

Further, the server or another unmanned aerial vehicle may update an existing three-dimensional environmental map according to the environmental data of a certain position, so as to provide the three-dimensional environmental map as the flight indication data to assist the low-end unmanned aerial vehicles requiring it.

S102: generating a flight control instruction according to the received flight indication data to control the flight of the aerial vehicle.

As described above, if the flight indication data is directly the three-dimensional environmental map of a related region, corresponding flight control instructions are generated directly based on the three-dimensional environmental map to implement the flight, such as obstacle avoidance, navigation, automatic addressing and the like. If the flight indication data is data such as data of original positions, images, obstacles and the like, in S102, the controller may first generate the three-dimensional environmental map based on the flight indication data of the original positions, images, obstacles and the like, and then generate corresponding flight control instructions according to the three-dimensional environmental map, to implement the flight such as obstacle avoidance, navigation, automatic addressing or the like. The flight control instructions may be generated directly according to aerial vehicle dock data included in the flight indication data to change a yaw and an altitude of the aerial vehicle, so as to control the aerial vehicle to fly towards the dock indicated by the aerial vehicle dock data. The aerial vehicle dock data may include position coordinate information of the dock of the aerial vehicle. The dock of the aerial vehicle may serve as a landing platform for the aerial vehicle or have functions for powering related aerial vehicles and the like.

According to an embodiment of the present invention, an aerial vehicle can perform its own flight control using flight indication data shared from other aerial vehicles or servers, such that the aerial vehicle does not need to carry a large number of detecting devices, reducing its volume and weight, increasing the flight distance and reducing the cost.

Figure 2:
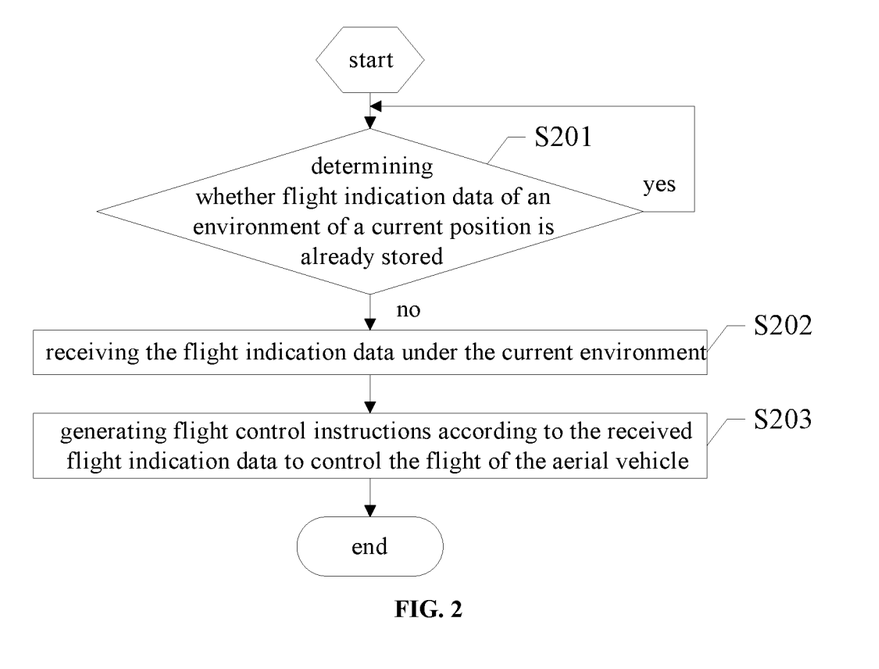
FIG. 2 is a flow chart of another flight control method for an aerial vehicle according to an embodiment of the present invention.

Referring to FIG. 2, a flow chart of another flight control method for an aerial vehicle according to an embodiment of the present invention, the flight control method may be implemented by a controller, which may be a controller separated from the aerial vehicle but connected with the flight control of the aerial vehicle, a flight controller disposed in the aerial vehicle, or a smart mobile terminal configured for controlling the flight of the aerial vehicle. Specifically, the flight control method may include following steps.

S201: determining whether flight indication data of an environment of a current position is already stored.

If no such data is stored, S202 as described below is performed, otherwise the present step is continued. Specifically, the current coordinate position can be obtained based on the GSP of the present aerial vehicle, and the stored existing data can be searched and compared to determine whether the current coordinate position falls within a smaller region range enclosed by the coordinate position data in the existing data. If it is determined that the current coordinate position falls within the smaller region range, it can be determined that there exists the flight indication data of the environment of the current position. If it is determined that the current coordinate position does not fall within the smaller region range, it can be determined that there is no stored flight indication data of the environment of the current position. Step S201 may be repeated many times to precisely determine whether the data of the current environment is stored.

S202: receiving the flight indication data under the current environment, the flight indication data including flight indication data detected by another aerial vehicle or provided by an external storage device.

Specifically, Receiving the flight indication data in S202 may comprise: sending a download request to the external storage device for requesting to download the flight indication data from the external storage device (e.g., a server), where the download request includes current position information. Alternatively, receiving the flight indication data in S202 comprises: receiving at a preset frequency the flight indication data of the environment of the current position broadcasted by another unmanned aerial vehicle. The download request may be sent to the server and the broadcasted flight indication data may be received simultaneously, so as to obtain more timely and more precisely the related information. Further, in one embodiment, the data provided by the server may be preferred by the aerial vehicle.

In some embodiments, specifically, the download request may be in particular a request for requesting a flight path, and the server, after receiving the download request for requesting the flight path, looks up the stored related environmental map based on the position information in the download request, plans a flight path, and then replies to the aerial vehicle with the flight path.

S203: generating flight control instructions according to the received flight indication data to control the flight of the aerial vehicle.

In S203, it may be detected whether the current position is located in a position region described in the received flight indication data. If the current position is located in the described position region, it is determined that the received flight indication data is the flight indication data of the required position, thereby the flight control instruction is generated according to the received flight indication data. If the received flight indication data is not the flight indication data of the required position, the flight indication data may be requested to be downloaded again from the server.

In some embodiments, optionally, the requested or received flight indication data may be a three-dimensional environmental map. Generating flight control instructions according to the received flight indication data may specifically comprise: determining an environmental map of the current environment according to the received flight indication data, the determined environmental map includes the three-dimensional environmental map; generating flight control instructions according to the determined environmental map and the current position of the aerial vehicle. That is, the three-dimensional environmental map may be extracted directly from the flight indication data to assist the flight, or the flight indication data is related data to the three-dimensional environmental map and, after the related data is extracted, some data restoration operations may be performed further to determine the three-dimensional environmental map.

Further, optionally, generating a flight control instruction according to the received flight indication data may specifically comprise: if the flight indication data includes no-fly zone indication information, determining a minimum distance from a border of a no-fly zone indicated by the no-fly zone indication information according to the current position; if the determined minimum distance is less than a preset distance threshold or the current position is within the no-fly zone, generating a flight control instruction for controlling the aerial vehicle to fly away from the no-fly zone.

In addition, the flight control method according to an embodiment of the present invention may further comprise: deploying a detecting module to acquire environmental data during the flight; sending the detected environmental data to an external storage device of a target address, or broadcasting the detected environmental data at a preset frequency. That is, for an aerial vehicle having a detecting module, the aerial vehicle may also acquire various kinds of flight indication data by the detecting module, and upload the acquired one or more kinds of flight indication data to the server, such that the server may perform corresponding data management or merging to obtain the three-dimensional environmental map, to facilitate the next flight or a flight of other aerial vehicles.

Optionally, specifically, the obtained flight control instruction may also be a flight control instruction generated based on the three-dimensional environmental map for avoiding obstacle, or for adjusting the flight path or the like.

Figure 3:
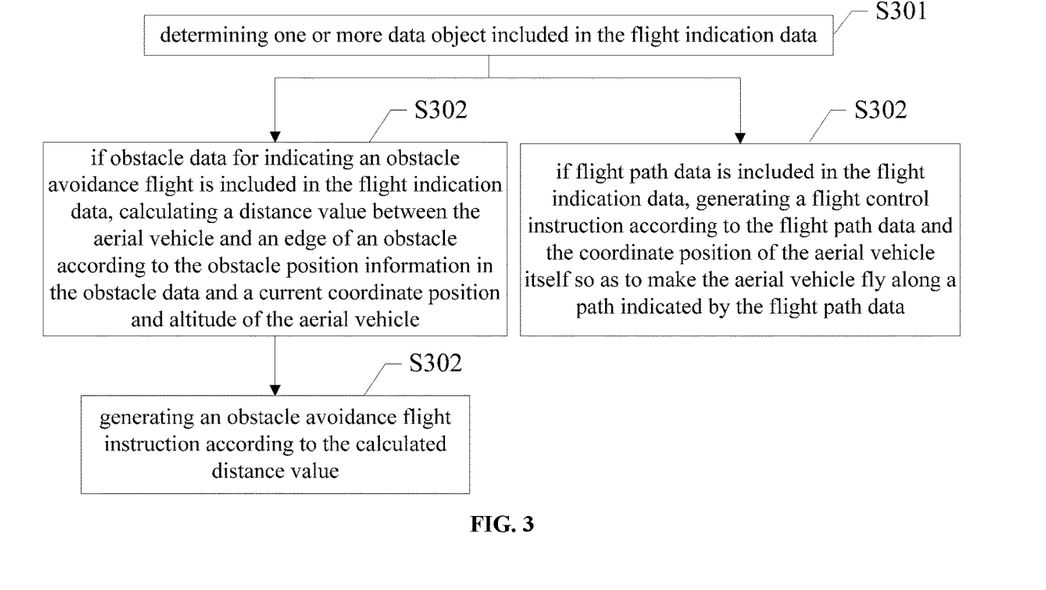
FIG. 3 is a flow chart of a method for generating flight control instructions according to an embodiment of the present invention.

Optionally, specifically, in addition to the above described environmental map data, the received flight indication data may further include obstacle data, flight path data or the like. Referring to FIG. 3, a flow chart of a method for generating a flight control instruction in an embodiment of the present invention, the method may comprise:

S301: determining one or more data object included in the flight indication data. The format of the flight indication data may be negotiated by the server and various types of aerial vehicles. The data object that can be carried by the flight indication data may include: the above described three-dimensional environmental map data, obstacle data, flight path data, aerial vehicle dock data, no-fly zone data, and the like.

S302: if the obstacle data for indicating an obstacle avoidance flight is included in the flight indication data, calculating a distance value between the aerial vehicle and an edge of the obstacle according to the obstacle position information in the obstacle data and a current coordinate position and altitude of the aerial vehicle.

The obstacle data in the present embodiment refers to related data of a plurality of obstacles within a region range in the environmental, including specifically an absolute coordinate position (range position) of each obstacle. In S302, the distance value(s) from the aerial vehicle to the edge(s) of one or more obstacles is/are calculated quickly, so as to generate the below-described obstacle avoidance flight instruction. In some embodiments, the coordinate positions of the obstacles refer to a set of three-dimensional coordinates including coordinates on X, Y, Z axes.

S303: generating an obstacle avoidance flight instruction according to the calculated distance value.

The obstacle avoidance flight instruction may comprise a flight direction instruction, a flight angle instruction and the like, which are sent to a propulsion component of the aerial vehicle to implement the obstacle avoidance flight.

S304: if the flight path data is included in the flight indication data, generating a flight control instruction according to the flight path data and the coordinate position of the aerial vehicle itself so as to make the aerial vehicle fly along a path indicated by the flight path data.

If the flight indication data is directly the flight path data, first a corresponding flight control instruction is generated based on the current coordinates and altitude of the controlled aerial vehicle, to adjust the aerial vehicle into a corresponding flight path. Then, a flight control instruction is generated based on the flight path data to cause the controlled aerial vehicle to fly along the flight path. The flight path data may specifically comprise some GPS coordinate points and corresponding altitude values, a flight control instruction is generated for adjusting the altitude and the coordinate position.

Figure 4:
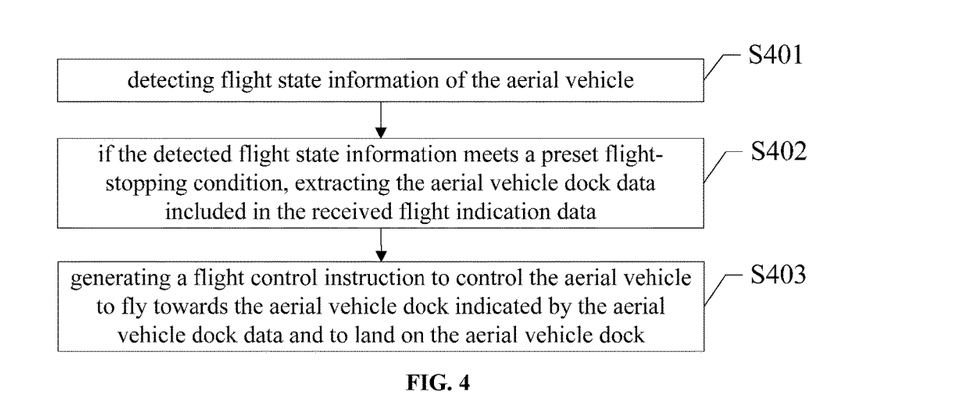
FIG. 4 is another flow chart of the method for generating flight control instructions according to an embodiment of the present invention.

FIG. 4 is another flow chart of a method for generating a flight control instruction in an embodiment of the present invention. In some embodiments, the flight indication data includes aerial vehicle dock data, while the aerial vehicle dock data may include the position coordinates of a position of an aerial vehicle dock. The aerial vehicle dock may serve as a landing platform of the aerial vehicle or provide the aerial vehicle with functions such as powering. Referring to FIG. 4, the method according to an embodiment of the present invention may comprise:

S401: detecting flight state information of the aerial vehicle. A possible remaining flight time may be determined by detecting remaining capacity of the battery, and the flight state of the aerial vehicle can also be determined.

S402: if the detected flight state information meets a preset flight-stopping condition, extracting the aerial vehicle dock data included in the received flight indication data.

Specifically, when the remaining capacity of the battery reaches an alert threshold, it is determined that the preset flight-stopping condition is met, and the aerial vehicle dock data is extracted from the received flight indication data.

S403: generating a flight control instruction to control the aerial vehicle to fly towards the aerial vehicle dock indicated by the aerial vehicle dock data and to land on the aerial vehicle dock. The aerial vehicle dock data includes position data of the aerial vehicle dock.

The aerial vehicle may park on the aerial vehicle dock and be charged so as to continue the flight after finishing charging, or stop on the aerial vehicle dock to facilitate the retrieval or to prevent the aerial vehicle from dropping down to hurt people when the battery runs out of power.

According to an embodiment of the present invention, an aerial vehicle can rely on the related flight indication data shared from other aerial vehicles or servers to implement its own flight control, such that the aerial vehicle does not need to carry a large number of detecting devices, reducing the volume and weight, increasing the flight distance, and reducing the cost of the aerial vehicle.

Figure 5:
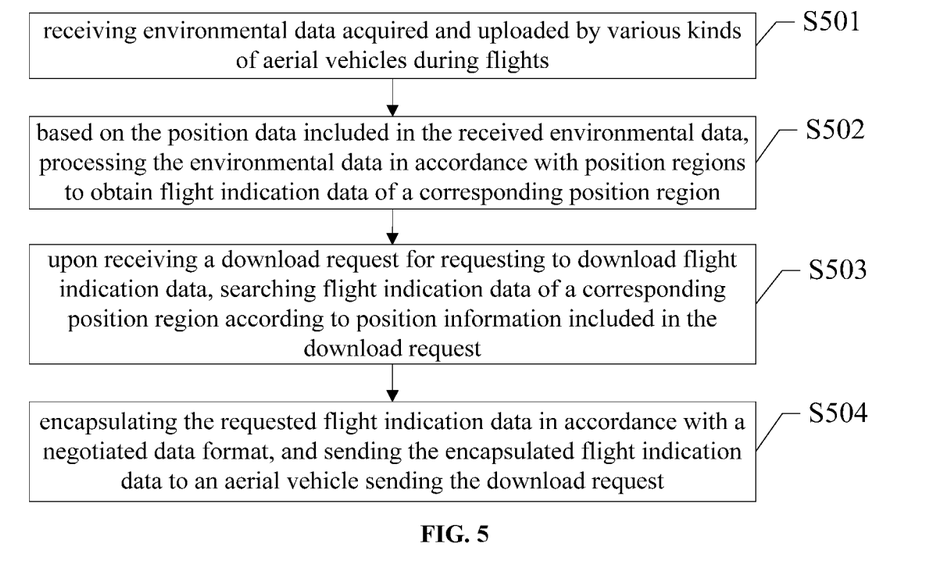
FIG. 5 is a flow chart of a method for processing flight data according to an embodiment of the present invention.

FIG. 5 is a flow chart of a method for processing flight data according to an embodiment of the present invention, and the method may be implemented by a server for managing an aerial vehicle. Referring to FIG. 5, the method may specifically comprise:

S501: receiving environmental data acquired and uploaded by various kinds of aerial vehicles during flights, the environmental data including image data and position data of an environment of a corresponding aerial vehicle.

S502: based on the position data included in the received environmental data, processing the environmental data in accordance with position regions to obtain flight indication data of a corresponding position region.

A three-dimensional environmental map of a related region may be preconfigured in the server. The preconfigured three-dimensional environmental map may be updated based on the environmental data received in S501. For example, based on the received image data and position data, map content of the corresponding position in the preconfigured three-dimensional environmental map can be updated. The updated three-dimensional environmental map may serve as the flight indication data of the corresponding position region.

Of course, the server may also generate a new three-dimensional environmental map based on a large amount of environmental data. In some embodiments, in S501, a large amount of environmental data of some regions at different positions and different azimuths may be obtained, and the server may generate the three-dimensional environmental map of a certain target region based on such environmental data. The target region may be a pre-defined region, specifically a region defined based on GPS position coordinates. If the coordinates indicated by the position data in the environmental data is within the target region, the environmental data may be determined as the environmental data of the target region. After the large amount of environmental data is thus obtained, the three-dimensional environmental map of this region may be generated.

Optionally, S502 may be an update process on the existing data. Specifically, S502 may comprise: updating the three-dimensional environmental map of the corresponding position region according to the position data included in the received environmental data; and using the updated three-dimensional environmental map as the flight indication data of the corresponding position region.

Optionally, the update process of S502 may be specifically: determining a receiving time of the received environmental data; determining a latest update time of map content of a region corresponding to the position data of the received environmental data in the current three-dimensional environmental map; based on the environmental data corresponding to the receiving time later than the latest update time, updating the map content of the corresponding position region in the existing three-dimensional environmental map, and using the updated three-dimensional environmental map as the flight indication data of the corresponding position region.

Further, optionally, a storage management may be performed on the received environmental data, thereby when a certain update period comes, the flight indication data, such as the generated three-dimensional environmental map and the like, may be updated according to the stored environmental data.

Specifically and optionally, after receiving the environmental data acquired and uploaded by various aerial vehicles during flights, the method further comprises: storing the environmental data with similar contents in a same data set; performing storage management on various data sets according to a preset storage management rule, while the storage management comprises deletion management for the environmental data. In some embodiments, the storage management rule is set based on any one or combination of: the receiving time of the environmental data, image quality of the image data in the environmental data, and difference between image contents in the environmental data with same contents. In the environmental data with similar contents included in a same data set, a distance value between any two environmental-data-acquiring position points is less than a preset distance threshold, and a difference value between any two environmental-data-acquiring azimuth angles relative to a reference direction is less than a preset angle threshold. Alternatively or additionally, in the environmental data with similar contents included in a same data set, a similarity between images of any two image data reaches a preset similarity threshold. Further, in the environmental data with similar contents included in a same data set, the distance value between any two environmental-data-acquiring position points is less than a preset distance threshold and a similarity between images of any two image data reaches a preset similarity threshold.

Whether the environmental data has similar contents may be determined according to a shooting direction and a position included in the environmental data. Image data shot in a same small spatial position range and a small shooting direction angle range (including an absolute direction angle, for example, an angle range of +/−5° towards due north direction) may be deemed as the environmental data with same contents. For example, images shot by two aerial vehicles at a same GPS coordinate position towards due north direction are considered as images with same contents. These images with same contents may be stored in a same data set, so as to select a desired image to merge when the flight indication data such as the three-dimensional environmental map and the like is merged.

The storage management rule may comprise: the data set always stores the recently received environmental data in accordance with the current time, the environmental data received earlier than the current time by a certain amount may be deleted. For example, the environmental data received a month ago is deleted. Thus, the storage management rule may be first-in-first-deleted.

Alternatively, the storage management rule may comprise: detecting the image quality of all the environmental data in a data set (including quality parameters such as image definition), only the environmental data with a desired quality is saved. For example only the image whose pixel value reaches a certain threshold is saved.

Alternatively, the storage management rule may comprise: an object contour included in each image in a data set is determined based on the pixel value of the images in the environmental data, and the object contours in various images are compared according to the positions in the images. The image whose object contour different from the object contours of a majority of other images is deleted. Specifically, a threshold for a total number of images to be compared may be set first and, when an image is inconsistent with a total number (equal to or greater than the threshold) of other images, the image may be deleted. For example, in ten images (environmental data) which are determined to have the same content, one image has an object contour of a flying bird, while the other 9 images do not have such object contour. Accordingly, at this time, the image having the object contour of the flying bird will be deleted.

Further, the storage management rule may also comprise a combination of two or three of the above described rules. For example, the time-based rule and the quality-based rule may be combined, and only the image that is closer to the current time and has image quality better than a certain threshold is saved. It may also use a combination based on a difference between the object contour of each image and the receiving time. For example, for two images in a data set which are received within a short time interval, if the similarity between the two images based on the object contours is no more than a preset similarity threshold, for example no more than 95%, the two images may be deleted directly and will not be included in the data set. On the other hand, if the two images are received at a longer time interval, for example, the time interval is greater than a preset threshold of one day, and when the image similarity reaches a certain threshold (for example 60%), it may be determined that the two images are the environmental data with similar contents, and are all stored into a corresponding data set and not deleted.

Further, processing the received environmental data in accordance with the position regions according to the position data included in the environmental data to obtain the flight indication data of the corresponding position region comprises: based on a preset selection rule, selecting a desired environmental data from each of the various data sets of the environmental data; based on the position data included in the selected various optimum environmental data, processing the various desired environmental data in accordance with the position regions to obtain the flight indication data of the corresponding position regions. In some embodiments, the selection rule is set based on any one or combination of the receiving time of the environmental data, image quality of the image data in the environmental data, and the difference between the image contents in the environmental data with same contents.

Likewise, the selection rule may include: always using the current time as the standard, and selecting the latest-received environmental data as the desired environmental data. For example, the environmental data received just now can be selected as the desired environmental data. Alternatively, the selection rule may include: detecting the image quality of all the environmental data in the data set (including quality parameter such as image definition), and the environmental data with the highest image quality is selected as the desired environmental data. Alternatively, the selection rule may also include: based on pixel values of images in the environmental data, determining an object contour included in each image in the data set, the object contours in various images are compared according to positions in the images, and the image with the clearest contour is selected as the desired environmental data. Further, the selection rule may be a combination of two or three of the above described rules. For example, a combination of time and quality can be used, and the image with the highest quality among the images received within a certain time threshold from the current time is selected as the desired environmental data.

S503: upon receiving a download request for requesting to download flight indication data, searching flight indication data of a corresponding position region according to position information included in the download request.

S504: encapsulating the requested flight indication data in accordance with a negotiated data format, and sending the encapsulated flight indication data to an aerial vehicle sending the download request.

Thus, according to an embodiment of the present invention, the flight indication data acquired by various kinds of aerial vehicles may be stored and managed, so as to provide related flight indication data to certain aerial vehicles requiring the data, and to enable these aerial vehicles to perform operations such as obstacle avoidance, safe path planning, and finding landing places based on these flight indication data.

An aerial vehicle and a server according to an embodiment of the present invention will be described in detail below.

Figure 6:
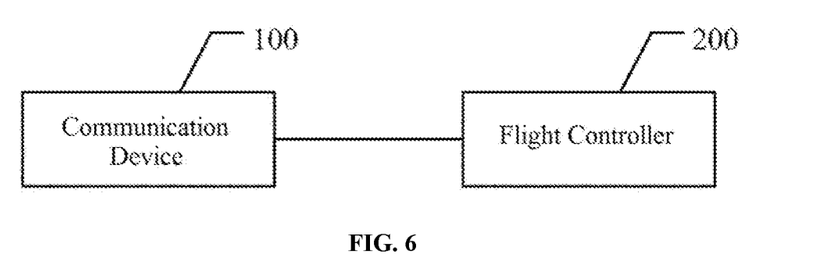
FIG. 6 is a schematic view of an aerial vehicle according to an embodiment of the present invention.

Referring to FIG. 6, a schematic view of an aerial vehicle according to an embodiment of the present invention, the aerial vehicle may comprise an aerial vehicle body, a power supply module, a propulsion component, a rotor wing or a fixed wing, a memory, and a data bus, etc. (not shown). In some embodiments, the aerial vehicle further comprises a communication device 100 and a flight controller 200, where the flight controller 200 may invoke related applications in the memory to perform various functions.

The flight controller 200 may be configured for generating flight control instructions according to flight indication data under a current environment received by the communication device 100, to control the flight of the aerial vehicle. The flight indication data may include the flight indication data detected by other unmanned aerial vehicles or provided by an external storage device.

The flight indication data may be some three-dimensional environmental map data for guiding an aerial vehicle to fly for obstacle avoidance or fly in accordance with a flight path, or may be some related data of various kinds of obstacles which might impact the flight of the aerial vehicle, for example, the size of the obstacle and a substantial range of coordinate position of the obstacle, and the like. Specifically, the external storage device may be a preconfigured server, and the followings are described using the server as an example.

The other unmanned aerial vehicles mainly refer to the unmanned aerial vehicles carrying various detecting devices. These unmanned aerial vehicles can obtain the environmental data of a region of a certain coordinate position based on the environmental images and distance data detected in real time by detecting devices such as a camera, an ultrasonic wave sensor and a radar, in combination with positioning data obtained by their own GPS. These unmanned aerial vehicles may send the obtained environmental data to a designated server or another unmanned aerial vehicle, or merge the obtained environmental data to obtain a three-dimensional environmental map of an environmental region of a certain coordinate position, then send the three-dimensional environmental map as the flight indication data of the corresponding position to the designated server or another unmanned aerial vehicle.

The sever may be an open server, which may receive various environmental data uploaded by a variety of unmanned aerial vehicles and perform storage management on the uploaded environmental data based on the position data in the environmental data. The server may also merge a large amount of environmental data and their corresponding positions to obtain a more precise three-dimensional environmental map of some position regions, and provide the obtained three-dimensional environmental map as the flight indication data to some requesting aerial vehicles.

Further optionally, in some embodiments, the flight controller 200 is further configured for determining whether, during a flight, the flight indication data of an environment of the current position is stored. if not stored, sending a download request for requesting to download the flight indication data from the external storage device by the communication device 100, and the download request includes position information of the current environment. The download request is sent to the external storage device to download corresponding flight indication data from the external storage device (server).

Further, optionally, the flight controller 200 is also configured for controlling the communication module to receive, at a preset frequency, the flight indication data of the environment of the current position broadcasted by other unmanned aerial vehicles.

The flight controller 200, when it is detected that there is not various kinds of flight indication data under the current position, may obtain corresponding flight indication data by the above described requesting to download and/or listening the broadcasting of adjacent unmanned aerial vehicles at a preset frequency.

Further, optionally, the flight controller 200 is specifically configured for determining the environmental map of the current environment according to the received flight indication data; and for generating a flight control instruction according to the determined environmental map and the current position of the aerial vehicle, where the determined environmental map includes a three-dimensional environmental map.

Further, optionally, the flight controller 200 is specifically configured for detecting whether the current position is located in the position region described in the received flight indication data. If yes, generating a flight control instruction according to the received flight indication data.

When the received flight indication data includes information about a plurality of positions, the inform about each position may be used together to determine whether the received data is the required environmental position.

Further, optionally, the flight controller 200 is specifically configured for, if the flight indication data includes obstacle data for indicating an obstacle avoidance flight, calculating a distance value of the aerial vehicle and an edge of the obstacle according to obstacle position information in the obstacle data and current coordinate position and altitude of the aerial vehicle, and for generating an obstacle avoidance flight instruction according to the calculated distance value. If the flight indication data includes flight path data, the flight controller 200 is configured for generating a flight control instruction according to the flight path data and the coordinate position of the aerial vehicle itself, so as to facilitate the aerial vehicle to fly along a path indicated by the flight path data.

Further, optionally, the flight controller 200 is specifically configured for detecting flight state information of the aerial vehicle and, if the detected flight state information meets a preset flight-stopping condition, for extracting aerial vehicle dock data included in the received flight indication data; and generating a flight control instruction to control the aerial vehicle to fly towards the aerial vehicle dock indicated by the aerial vehicle dock data and to land on the aerial vehicle dock. The aerial vehicle dock data includes position data of the aerial vehicle dock.

Further, optionally, the flight controller 200 is specifically configured for, if the flight indication data includes no-fly zone indication information, determining a minimum distance to a border of a no-fly zone indicated by the no-fly zone indication information according to the current position and, if the determined minimum distance is less than a preset distance threshold or the current position is within the no-fly zone, for generating a flight control instruction for controlling the aerial vehicle to fly away from the no-fly zone.

Further, optionally, the flight controller 200 is also configured for acquiring environmental data during a flight; sending the detected environmental data to an external storage device at a target address via the communication device 100, or controlling the communication device 100 to broadcast the detected environmental data at a preset frequency.

Further, the specific implementations of various functions of the above described flight controller 200 may refer to the description of related method steps in corresponding embodiments of FIG. 1 to FIG. 6.

Thus, according to an embodiment of the present invention, an aerial vehicle can rely on related flight indication data shared from other aerial vehicles or a server to implement the control for its own flight, such that there is no need for the aerial vehicle to carry a large number of detecting devices, reducing the volume and weight of the aerial vehicle, increasing the flight distance, and reducing the cost of the aerial vehicle.

Figure 7:
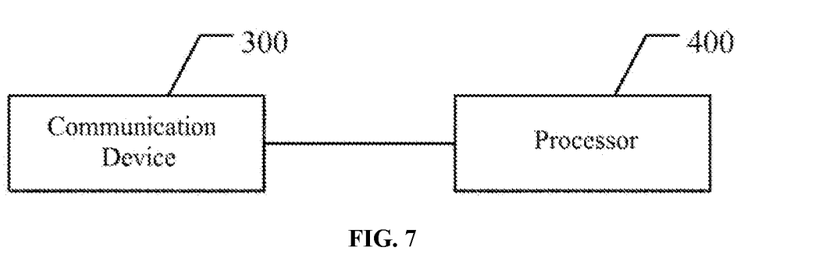
FIG. 7 is a schematic view of a server according to an embodiment of the present invention.

Referring to FIG. 7, a schematic view of a server according to an embodiment of the present invention, the server may be a server which is configured for managing a large number of aerial vehicles. The server specifically comprises a communication device 300 and a processor 400.

The communication device 300 is configured for receiving environmental data acquired and uploaded by various aerial vehicles during flights, and the environmental data includes image data and position data of an environment;

The processor 400 is configured for, based on the position data included in the received environmental data, processing the environmental data in accordance with position regions to obtain flight indication data of a corresponding position region.

In some embodiments, the environmental data includes a large amount of environment-related data, for example, images, videos and the like, and the server may be enabled to generate a three-dimensional environmental map of related region based on the environmental data uploaded by various kinds of aerial vehicles. The server may specifically store original environmental data in accordance with position regions, or store only the three-dimensional environmental map merged and calculated based on various original environmental data.

The processor 400 is further configured for, when the communication device 300 receives a download request for requesting to download flight indication data, searching the flight indication data of the corresponding position region according to position information included in the download request; encapsulating the located flight indication data in accordance with a negotiated data format, and sending the encapsulated flight indication data to an aerial vehicle sending the download request via the communication device 300.

The server may reply with only related environmental data as the flight indication data, and the aerial vehicle sending the download request may then merge the flight indication data to obtain the three-dimensional environmental map or other data.

In some embodiments, the aerial vehicle requesting to download the flight indication data is only provided with a three-dimensional environmental map of an associated position region, for example, the three-dimensional environmental map of a spherical space region having a radius of 100 m and its center as the coordinate position in the download request, which may decrease the amount of data to be transmitted, and enabling the data to be transmitted timely.

Further, optionally, the processor 400 is specifically configured for updating the three-dimensional environmental map of a corresponding position region according to position data included in the received environmental data; and for using the updated three-dimensional environmental map as the flight indication data of the corresponding position region.

Further, optionally, the processor 400 is specifically configured for determining a receiving time of the received environmental data; determining a latest update time of the map content of a region corresponding to the position data of the received environmental data in the current three-dimensional environmental map; updating the map of the corresponding position region in the current three-dimensional environmental map according to environmental data with a receiving time later than the latest update time, and using the updated three-dimensional environmental map as the flight indication data.

Further, optionally, the processor 400 is also configured for storing environmental data with similar contents in a same data set; and performing storage management on various data sets according to a preset storage management rule. The storage management includes deletion management for environmental data and, in some embodiments, the storage management rule is set based on any one or combination of the receiving time of the environmental data, image quality of image data in the environmental data, and a difference between image contents in the environmental data with same contents. In environmental data with similar contents included in the same data set, a distance value between any two environmental data acquiring position points is less than a preset distance threshold, and a difference value of any two environmental data acquiring azimuth angles relative to a reference direction is less than a preset angle threshold. Alternatively, in environmental data with similar contents included in the same data set, the similarity between images of any two image data reaches a preset similarity threshold.

Further, optionally, the processor 400 is specifically configured for, based on a preset selection rule, selecting a desired environmental data from various data sets of environmental data; and, based on position data included in the selected various desired environmental data, processing the various desired environmental data in accordance with position regions to obtain the flight indication data of the corresponding position region. In some embodiments, the selection rule is set based on any one or combination of the receiving time of the environmental data, image quality of image data in the environmental data, and a difference between the image contents in the environmental data with same contents.

It should be noted that, the specific implementation of the processor 400 may be referred to the description corresponding to related steps in the above described methods.

Thus, according to an embodiment of the present invention, a server or an aerial vehicle may store and manage the environmental data acquired by various aerial vehicles, such that, when requested by an aerial vehicle, related environmental data can be provided to the requesting aerial vehicle, and the requesting aerial vehicle is enabled to perform operations such as obstacle avoidance, safe path planning, and finding a landing place based on the provided environmental data.

In the several embodiments provided by the present invention, it should be understood that, the disclosed related device and method may be implemented by other ways. For example, the above described device embodiments are merely schematic, the division of the modules or units is merely a logic function division, and other division manners may be employed in actual practice. Also for example, more units or components may be combined or may be integrated into another system. Alternatively, some features may be omitted or not be performed. Additionally, coupling, direct coupling, or communication connections between one and another as displayed or discussed may be indirect coupling or communication connections via some interfaces, devices or units, or may be in electric, mechanical or other forms.

Units described as separate parts may or may not be separated physically. Components displayed as units may or may not be physical units, i.e., may be located in one place, or may be distributed onto a plurality of network units. Some or all of the units may be selected in order to achieve the objectives of the embodiments according to the actual requirements.

Additionally, various functional units in various embodiments according to the present invention may be integrated into one processing unit, or may be physically separated. Two or more of various function units may be integrated into one unit. The above integrated unit may be implemented in a form of hardware or in a form of functional units of software.

The integrated units, if being implemented in a form of software functional units and being independent products for sale and use, may be stored in a computer-readable storage medium. Based on such understanding, part or all of the technical solution of the present invention may be embodied in a form of a software product. The software product may be stored in the computer-readable storage medium, and comprise several instructions for causing the computer processor to execute some or all of steps of the methods in various embodiments according to the present invention. The above-mentioned storage medium may comprise: a USB flash disk, a movable hard disc, a Read-Only Memory (ROM), a random access memory (RAM), a diskette or an optical disc and various medium capable of storing program codes.

The foregoing disclosure is merely illustrative of the embodiments of the invention, and is not intended to limit the scope of the invention. Any equivalent structural or flow variations made on the basis of the description and the drawings of the invention, and their direct or indirect application to other relevant technical fields, shall all fall into the patentable scope of the invention.

What is claimed is:

1. A method for processing flight data comprising:
acquiring, by detecting devices carried by one or more first aerial vehicles, environmental data associated to a position region, the environmental data including obstacle data within the position region;
establishing a wireless connection between the one or more first aerial vehicles and an external device, the wireless connection including at least one of a WIFI network, a satellite network, or a cellular network; and
sending, by the one or more first aerial vehicles through the wireless connection, the environmental data to the external device, the environmental data being configured to generate a flight control instruction for controlling an operation of a second aerial vehicle while the second aerial vehicle is within the position region, the flight control instruction including an instruction for controlling the second aerial vehicle to perform obstacle avoidance based on the obstacle data, the and the external device being external to and remotely connected to the second aerial vehicle.

2. The method of claim 1, further comprising:
    merging the environmental data to obtain a three-dimensional environmental map; and
    sending the three-dimensional environmental map as flight indication data of the position region to the external device.

3. The method of claim 1, wherein the environmental data further includes at least one of position data associated to the position region, image data associated to the position region, or a three-dimensional environmental map.

4. The method of claim 1, wherein:
    the external device is an external storage device; and
    sending the environmental data to the external device includes uploading the environmental data to the external storage device, external storage device being configured to send the flight indication data to the second aerial vehicle upon receiving a download request from the second aerial vehicle.

5. The method of claim 4, wherein uploading the environmental data to the external storage device includes uploading the environmental data by the one or more first aerial vehicle during flights.

6. The method of claim 1, wherein:
    the external device is a remote controller of the second aerial vehicle.

7. The method of claim 1, wherein:
    the environmental data further includes aerial vehicle dock data about an aerial vehicle dock; and
    the flight control instruction further includes an instruction for controlling the second aerial vehicle to fly towards the aerial vehicle dock based on aerial vehicle dock data in response to that flight state information of the second aerial vehicle meets a preset flight-stopping condition.

8. An aerial vehicle comprising:
    a memory storing a software program; and
    a flight controller configured to execute the software program to:
        acquire, by detecting devices carried by the aerial vehicle, flight path data associated to a position region; and
        send the flight path data to an external device, the flight path data being configured to generate a flight control instruction for controlling an operation of another aerial vehicle while the another aerial vehicle is within the position region, the flight control instruction including an instruction for controlling the another aerial vehicle to fly along a path indicated by the flight path data, the external device being external to the another aerial vehicle.

9. A method for processing flight data comprising:
    receiving, at an external device, environmental data acquired and uploaded by one or more first aerial vehicles, the environmental data including obstacle data within the position region;
    based on position data included in the received environmental data, obtaining flight indication data of a corresponding position region;
    establishing a wireless connection between the external device and the one or more first aerial vehicles, the wireless connection including at least one of a WIFI network, a satellite network, or a cellular network; and
    sending the flight indication data to a second aerial vehicle sending a download request, the external device being external to both the one or more first aerial vehicle and the second aerial vehicle, the flight indication data being configured to generate a flight control instruction for controlling an operation of the second aerial vehicle while the second aerial vehicle is within the corresponding position region, and the flight control instruction including an instruction for controlling the second aerial vehicle to perform obstacle avoidance based on the obstacle data.

10. The method of claim 9, wherein sending the flight indication data to the second aerial vehicle includes:
    in response to receiving the download request for requesting to download flight instruction data, searching the flight indication data of a corresponding position region according to position information included in the download request; and
    sending the flight indication data to the second aerial vehicle.

11. The method of claim 9, wherein sending the flight indication data to the second aerial vehicle includes:
    encapsulating the flight indication data of the corresponding position region in accordance with a negotiated data format; and
    sending the encapsulated flight indication data to the second aerial vehicle sending the download request.

12. The method of claim 9, further comprising:
    updating a three-dimensional environmental map of the corresponding position region according to the position data included in the received environmental data; and
    using the updated three-dimensional environmental map as the flight indication data of the corresponding position region.

13. The method of claim 12, wherein updating the three-dimensional environmental map of the corresponding position region includes:
    determining a receiving time of the received environmental data;
    determining a latest update time of a map content of a region corresponding to the position data of the received environmental data in the three-dimensional environmental map;
    in response to the receiving time being later than the latest update time, updating a map of the corresponding position region in the three-dimensional environmental map according to the received environmental data to obtain an updated three-dimensional environmental map; and
    taking the updated three-dimensional environmental map as the flight indication data.

14. The method of claim 9, further comprising:
    storing environmental data with similar contents in a same data set, the environmental data with similar contents having at least similar acquiring positions.

15. The method of claim 14, further comprising:
    performing storage management on various data sets according to a preset storage management rule.

16. The method of claim 15, wherein the storage management rule is set based on at least one of a receiving time of the environmental data, an image quality of image data in the environmental data, or a difference between image contents in the environmental data with similar contents.

17. The method of claim 16, wherein the storage management rule based on the difference between the image contents in the environmental data with similar contents includes:
    in the same data set, for any two pieces of environmental data with similar contents:
        a distance value between acquiring position points of the two pieces of environmental data is less than a preset distance threshold, and a difference value between acquiring azimuth angles of the two pieces of environmental data relative to a reference direction is less than a preset angle threshold.

18. The method of claim 16, wherein the storage management rule includes:
in the environmental data with similar contents included in the same data set, a similarity between images of any two image data reaches a preset similarity threshold.

19. The method of claim 14, further comprising:
selecting desired environmental data from various data sets of the environmental data in accordance with a preset selection rule; and
processing various desired environmental data in accordance with position regions according to position data included in the various desired environmental data, to obtain the flight indication data of the corresponding position region.

20. The method of claim 19, wherein the selection rule is set based on at least one of a receiving time of the environmental data, an image quality of image data in the environmental data, or a difference between image contents in the environmental data with similar contents.

* * * * *